Feb. 10, 1931.   C. W. VOGT   1,791,772
PROCESS AND APPARATUS FOR CONTINUOUS MANUFACTURE OF ICE CREAM
Filed June 2, 1927   4 Sheets-Sheet 1
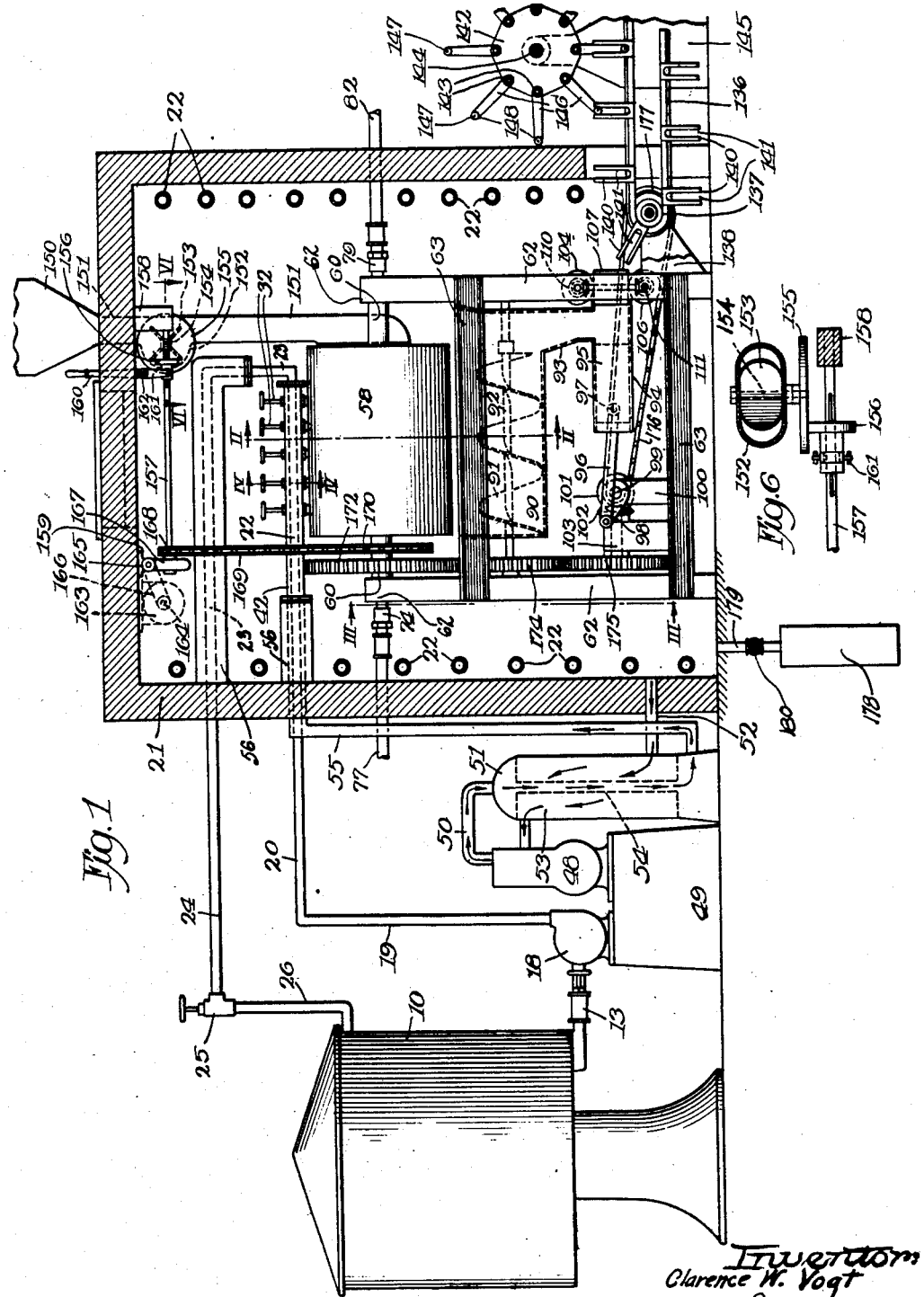

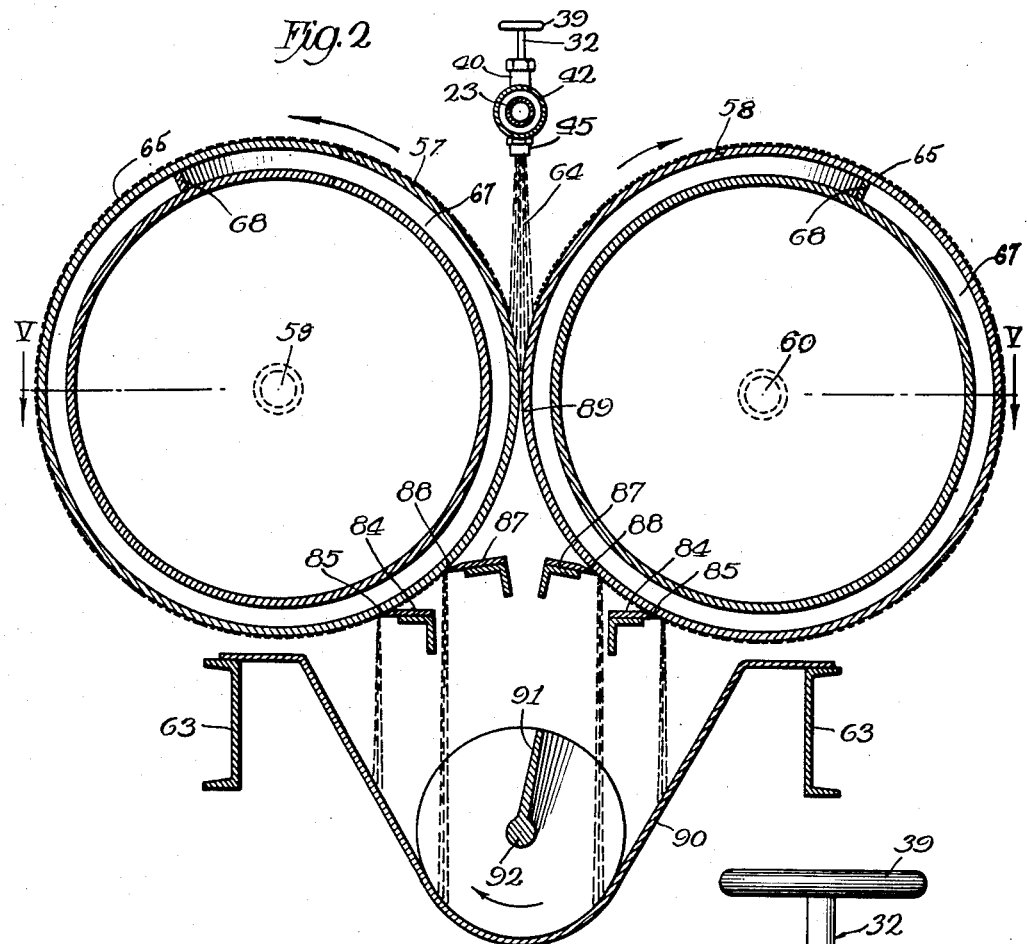

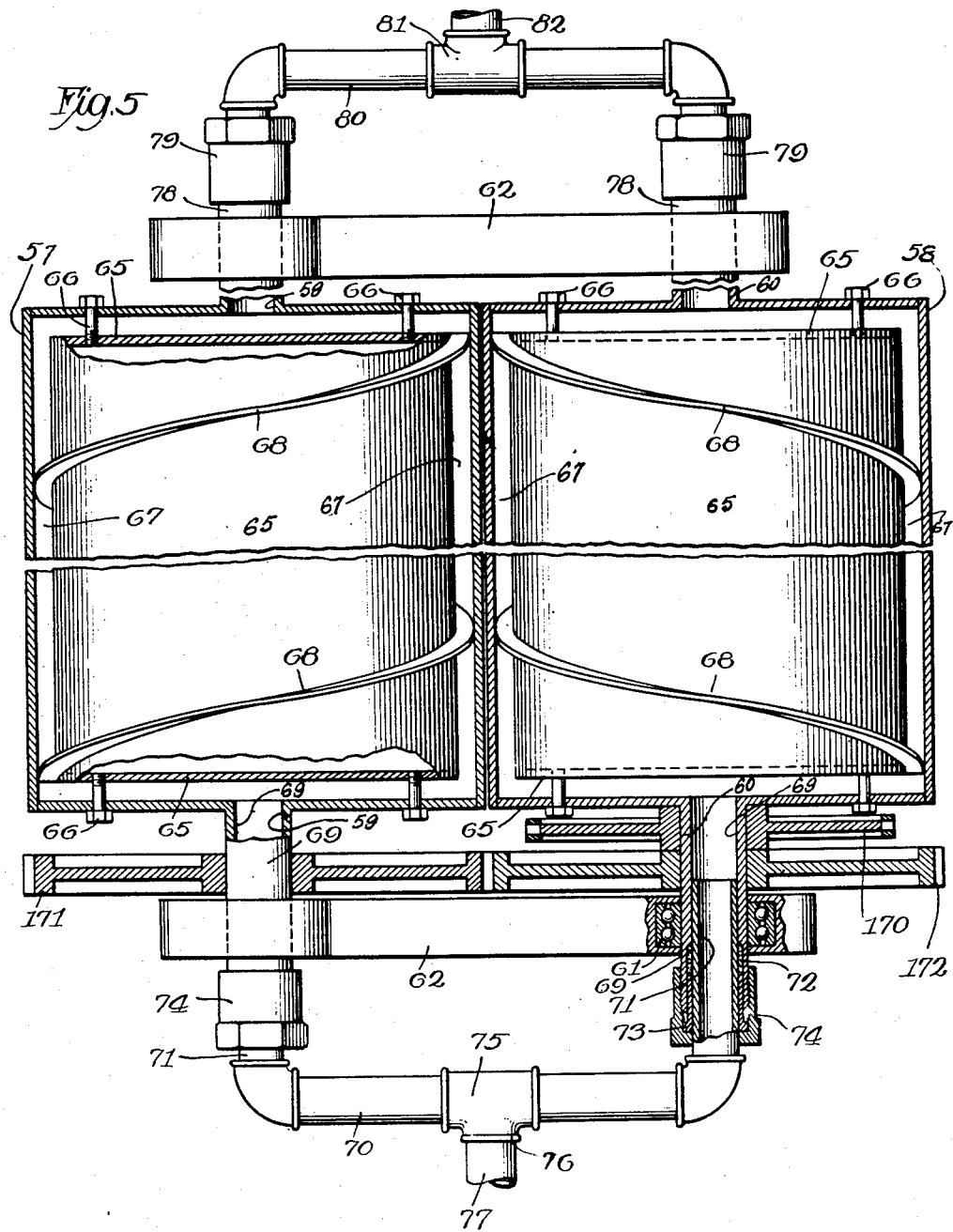

Feb. 10, 1931. C. W. VOGT 1,791,772
PROCESS AND APPARATUS FOR CONTINUOUS MANUFACTURE OF ICE CREAM
Filed June 2, 1927 4 Sheets-Sheet 4
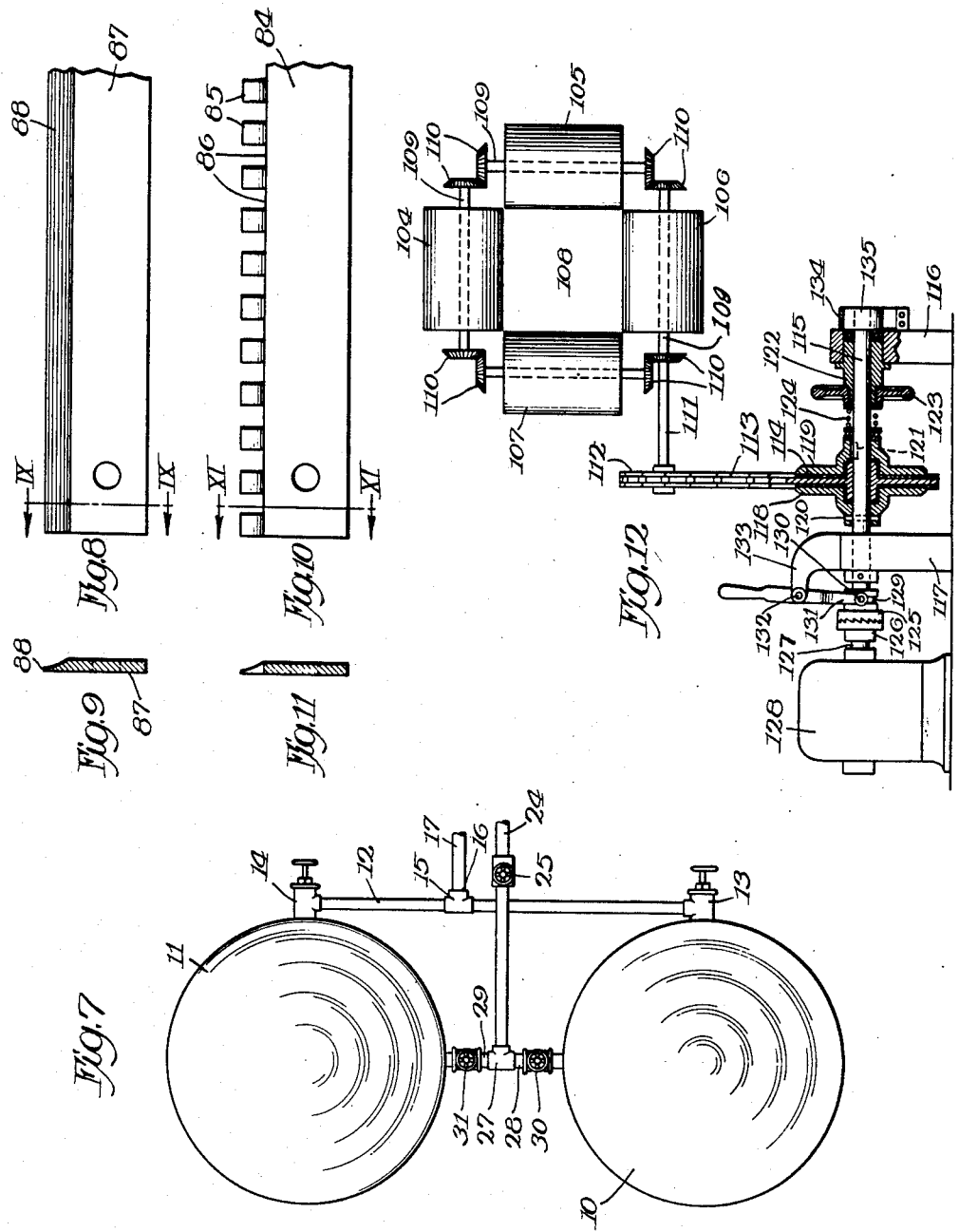

Patented Feb. 10, 1931

1,791,772

UNITED STATES PATENT OFFICE

CLARENCE W. VOGT, OF LOUISVILLE, KENTUCKY, ASSIGNOR TO VOGT INSTANT FREEZERS, INCORPORATED, OF LOUISVILLE, KENTUCKY, A CORPORATION OF DELAWARE

PROCESS AND APPARATUS FOR CONTINUOUS MANUFACTURE OF ICE CREAM

Application filed June 2, 1927. Serial No. 196,050.

This invention relates to a method and means for congealing liquids and more particularly to a continuous process of manufacturing ice cream, although it may be employed with equal advantage for other purposes.

It contemplates more especially the adaptation of instrumentalities to a novel commercial process whereby liquids may be continuously and efficiently congealed to produce frozen delicacies having the desired plastic consistency variable through a wide range.

Known commercial methods require batch treatment of liquids to impart thereto the desired properties prior to the congelation thereof. Naturally, such procedure is not conducive to efficient commercial production of frozen substances in that much labor, equipment, and time is involved therein.

Further, known methods of freezing are not sufficiently efficacious, and therefore require the subjection of the resulting product to a continued frigid temperature to effect the complete solidification thereof. Not only is the solidification incomplete, but the consistency thereof, which is a factor of the overrun or gain, is not controllable within any predetermined limits, and as a result the commercial product is comparatively expensive and not altogether uniform.

Commercial ice cream should contain sufficient air to result in a material overrun or gain at the freezer, this being accomplished with known methods by the agitation of the liquid simultaneously with the freezing thereof. The packing of ice cream in containers which are retained in the hardening room to effect the complete solidification thereof, usually results in a loss of the overrun or gain varying from five percent to thirty percent, thereby rendering the density thereof uncontrollable and variable.

The present method and means enables the control of the density of overrun within one or two percent, thereby producing a product of such uniformity as to permit the sale thereof by weight or volume.

One object of the present invention is to provide an improved commercial method for producing congealed substances.

Another object is the provision of a continuous process of manufacturing normally liquid substances frozen to a substantially solid state.

Another object is the provision of a continuous process involving the congelation of liquids, imparting a predetermined density thereto, and effecting the severance thereof into segments of predetermined size.

Still another object is to provide a method of congealing substances to any predetermined density.

A further object is the provision of a continuous process of freezing normally liquid substances by the subjection thereof to refrigerated surfaces.

A further object is the provision of a continuous process of freezing normally liquid substances by effecting the atomization thereof prior to congelation.

A still further object is the provision of a continuous process of converting liquids into edible briquettes of predetermined density.

Still a further object is the provision of novel means for effecting the continuous production of congealed substances.

Other objects and advantages will appear from the following description of an illustrative embodiment of the present invention.

In the drawings:

Figure 1 is a sectional view in elevation of instrumentalities capable of carrying into effect the process embodying features of the present invention;

Figure 2 is a sectional view in elevation taken substantially along line II—II of Figure 1;

Figure 3 is a view in elevation taken substantially along line III—III of Figure 1;

Figure 4 is a sectional view in elevation of a nozzle taken substantially along line IV—IV of Figure 1;

Figure 5 is a plan view in section taken substantially along line V—V of Figure 2;

Figure 6 is a sectional view taken substantially along the line VI—VI of Figure 1;

Figure 7 is a plan view of the storage tanks disclosed in Figure 1;

Figure 8 is a fragmentary view of a scraper disclosed in Figure 2;

Figure 9 is a sectional view taken substantially along the line IX—IX of Figure 8;

Figure 10 is a fragmentary view of another scraper disclosed in Figure 2, it being disposed beneath the scraper disclosed in Figure 8;

Figure 11 is a sectional view taken substantially along line XI—XI of Figure 10; and Figure 12 is a view in elevation of the density control apparatus disclosed in Figure 1, certain portions thereof being illustrated in section to clarify the showing.

The means selected for illustration exemplifies a manner whereby a method embodying features of the present invention may commercially be carried into effect, there being shown a battery of fluid supply tanks 10 and 11, in this instance two, provided with a conduit 12 which establishes communication therebetween. The conduit 12 terminates in valves 13 and 14 of standard construction which control the fluid discharge from the containers 10 and 11 respectively. A T-union 15, of standard construction, is interposed between the extremities of the conduit 12, the branch 16 thereof being in threaded engagement with a conduit 17 which terminates in a pump 18 of conventional design.

The pump 18 directs the fluid from either container 10 or 11 along a predetermined path to effect the congelation thereof, the path being defined in this instance by a vertically extending pipe 19 which communicates with the pump 18 at one extremity thereof and terminates in a horizontally disposed conduit 20 which enters a so-called "zero" room 21 having evaporator coils 22 in proximity to the interior confines thereof to maintain it at a freezing temperature. The zero room is so named because the temperature therein is preferably maintained at or near the Fahrenheit zero, although it is to be understood that this temperature may be varied if necessary for the particular product under process.

The pipe 20 communicates with a pipe 23 shaped to define a substantially U-section which communicates with a pipe 24 disposed exteriorly of the zero room 21 to effect the return of the fluid to the tanks 11 or 12, or both, depending upon the valve adjustment. The conduit 24 has a pressure relief valve 25 in communication therewith which controls the return of the surplus fluid through a pipe 26 terminating in a T-union 27 of standard construction. The aligned branches of the T-union 27 have pipes 28 and 29 in threaded engagement therewith to establish communication with the containers 10 and 11, respectively, near the top thereof, the pipes 28 and 29 being provided with manually operated valves 30 and 31 to control the return of the fluid to the tank from whence it was pumped, thereby affording complete circulation of the liquid usually employed in the manufacture of ice cream. Obviously, any suitable liquid may be directed therethrough, this depending entirely upon the nature of the frozen delicacy to be produced in a manner to be hereinafter described.

The present method contemplates the division of a liquid into particles sufficiently minute to effect the homogenation and preferably the atomization thereof prior to congelation. This is accomplished in the present embodiment by providing a series of nozzles 32, in this instance five secured within the horizontally disposed arm of the U-section 23 which is confined in the zero room 21. The nozzles 32 consist of the usual constricted orifice 33 defined by a substantially conical member 34 which is in threaded engagement with the pipe 23 (Figure 4). A needle valve 35 has a threaded shank 36 in engagement with an aperture 37 aligned axially of the orifice 33 so that the needle point 38 thereof can be adjusted axially of the orifice 33 to control the discharge therethrough. To enable the convenient manipulation of the valve 35, the extremity of the shank 36 is provided with a hand wheel 39 which facilitates the rotation thereof in any desired direction to effect the approach or recession of the needle point 38.

The shank 36 is preferably journalled in a bushing 40 having a threaded annular surface 41 thereon to engage a correspondingly shaped aperture provided in a conduit 42 which envelops the conduit 23 in concentric spaced relation therewith to define an annular passage 43 therebetween which affords the supply of air in association with the orifice 33, the pipe 42 being provided with apertures 44 to receive the orifice body 34 which projects therethrough. The apertures 44 are provided with a cylindrical body 45 in threaded engagement therewith, the body 45 being provided with a conical aperture 46 therein in proximity to the projecting end of the orifice 33 to enable the air to pass therethrough to effect homogenation or atomization, or both, of the liquid issuing through the orifice 33 in the form of a spray. To more effectively aerate the issuing liquid, the cylindrical body 45 is provided with a series of inclined circumferentially spaced apertures 47 which communicate with the air passage 43 to enable the air to forcefully impinge against the liquid which is discharged with high velocity through the nozzle orifice 33.

The air flowing through the passage 43 is supplied from an air compressor 48 of standard construction mounted on a suitable base 49 which also supports the pump 18, supra.

Air is directed through the annular passage 43 by virtue of a pipe 50 in communication with the exhaust valve of the compressor 48, the other extremity of the pipe 50 terminating in a heat exchanger 51 wherein the air is cooled by virtue of the air discharged from the zero room to a pipe 52 in communication with the interior 53 of the exchanger 51. The exchanger 51 has a centrally disposed pipe 54 therein for establishing communication between the pipe 50 and a pipe 55 connected to the pipe 23 to furnish air in association with the nozzles. The pipe 42 together with a portion of the pipe 23 is covered with a thermal insulator 56 in enveloping relation therewith.

With the arrangement of parts thus far described, various flavored mixtures are preferably employed in each of the containers 10 and 11 so that ice cream of any desired flavor may be manufactured by manipulation of the valves 13—14 and 30—31, the pump 18 directing the flow from the containers 10 through pipes 19, 20, and 23 wherein it is subjected to the frigid temperature of the zero room 21 prior to the return of a portion thereof to the containers or tanks 10 to complete a cycle.

During the passage of the liquid along this predetermined path, air under pressure is supplied by the compressor 48 in association with the nozzle discharge orifices 33 to effect the atomization of the liquid which is discharged therethrough responsive to the pump pressure aided by the air pressure effective to cause a siphoning effect within the orifice 33, thereby atomizing the particles which are sprayed upon refrigerated surfaces, in this instance at the jointure of co-acting rollers 57 and 58. The rollers 57 and 58 are carried by tubular shafts 59 and 60 constituting the hubs thereof journalled in suitable bearings 61 constituting a part of the standards 62 maintained in spaced relation by the cross members 63 confined within the zero room 21. The rollers 57 and 58 are intergeared so as to rotate in opposed directions to receive the liquid spray 64 therebetween, thereby conveying the atomized particles along the refrigerated surfaces to effect congelation thereof.

The liquid particles contained on the surfaces 57 and 58 are refrigerated in any suitable manner, in this instance by circulating a brine solution about the interior surface thereof. To accomplish this end, the interior of the rollers 57 and 58 are provided with correspondingly shaped cylinders 65 which are secured to the end walls thereof by means of the threaded studs 66 of standard construction, thereby defining an annular space 67 in thermal contact with the interior surface of the rollers 57 and 58. The exterior surfaces of the cylinders 65 are each provided with a helically arranged blade 68 which defines a tortuous path for a brine solution introduced therein through the tubular bores 69 of the hubs 59 and 60 carrying the rollers 57 and 58.

As shown, the bores of the hubs of both rollers are in communication with a pipe line 70 which has normally projecting extremities 71 thereon in telescopic engagement with the tubular bores 69, these being provided with a packing 72 between the co-acting relatively moving parts thereof to prevent leakage therebetween. The packing 72 is maintained in frictional contact with the relatively rotating parts to effect a pressure tight seal by means of a telescopic collar 73 which is maintained in position by the cap 74 threaded on the tubular hub 69.

The pipe line 70 is provided with a T-union 75 which has a branch 76 thereof in communicating relation with a pipe 77 which establishes connection with a brine supply for effecting the travel thereof in contact with the interior surfaces of the rollers 57 and 58 along the tortuous path defined by the helixes 68, thereby absorbing the heat from the exterior surfaces thereof to maintain them refrigerated or at a comparatively low temperature. The brine solution passing through the pipe 77 enters both rollers 57 and 58 wherefrom it is discharged through the tubular axially aligned bores 78 of the opposite hubs 59 and 60 of the rollers, they being provided with a shaft packing confining instrumentality 79 in association therewith to enable the discharge through a pipe line 80 establishing communication between the hubs of both the rollers, the pipe line 80 having a T-union 81 therein to enable the connection of the pipe 82 thereto to effect the return of the brine solution to a refrigerating system of standard design.

It is to be noted that the association of air with the liquid simultaneously with its discharge through the nozzles results in the atomization thereof which is conducive to rapid congelation of the particles disposed on the comparatively large refrigerated surfaces 57 and 58. Further, the aeration of the liquid prior to congelation introduces the desired air content which heretofore was beaten therein by agitating means.

To remove the congealed substances from the rotating surfaces, a pair of blades 84 are fixed to the standards 62 in any appropriate manner so that the tapered edges 85 thereof will almost impinge against the surface of the rollers to effect the removal of the frozen substances therefrom, the tapered edges 85 being serrated as at 86 to effect the flaking thereof. Another pair of blades 87 are fixed to the standards 62 in any appropriate manner, they being disposed above the blades 84 so that the solid tapered edge 88 thereof will effect the removal of the remaining substances without permitting the travel thereof therebeyond, this being undesirable in that the rollers are substantially in contacting relation at 89 to prevent the passage of the atomized fluid discharge 64 therethrough.

The congealed substances are collected in a substantially V-shaped metallic trough 90 which is sustained by the cross members 63 along the edges thereof, the interior of the trough being provided with a helical conveyor blade 91 fixed to a shaft 92 journalled in the standards 62 in any appropriate manner. The peripheral edge of the blade 91 is shaped to conform with the bottom of the trough 90 so as to convey material to a chute 93 constituting the discharge end of the trough.

The congealed substances, commonly known as ice cream, may contain approximately 100 percent overrun or gain; that is to say, the volume thereof is doubled due to the presence of air within the ice cream. This is highly desirable from a commercial standpoint in that ice cream can be sold much cheaper on such a basis. It is, however, desirable to produce ice cream or other congealed substances of a predetermined density, and on that account the ice cream is discharged from the chute 93 to a horizontally disposed tubular casing 94 which has a correspondingly shaped piston 95 reciprocating therein by virtue of a connecting rod 96 pivoted thereto at 97. The connecting rod 96 is pivotally associated with a crank arm 98 which is fixed to a shaft 99 journalled in a bearing 100 which is supported upon a cross member 63. Rotation is imparted to the crank arm 98 by virtue of a bevel gear 101 fixed to the shaft 99, this gear being in mesh with a similarly shaped gear 102 fixed to a shaft 103 journalled in suitable bearings for rotation by a power source to be hereinafter described.

The cream deposited in the tubular casing 94 will be moved through a constriction, in this instance defined by a plurality of rollers 104, 105, 106, and 107 disposed normally with respect to each other so that the peripheral edges thereof will be in contacting relation to define a substantially rectangular orifice 108. The rollers are each fixed on suitable shafts 109 disposed normally to each other, the extremities thereof being provided with bevel gears 110 which are in mesh with each other so that unitary rotation will be imparted thereto. One of the shafts 109 is provided with an extension 111 having a sprocket wheel 112 fixed to the extremity thereof to receive a flexible chain 113 thereon. The chain 113 meshes with a sprocket wheel 114 idling on a shaft 115 which is journalled in a pair of spaced bearings 116 and 117. A pair of friction discs 118 and 119 are disposed on either side of the sprocket wheel 114 to co-act with the lateral faces thereof, the disc 118 being fixed to the shaft 115 by means of a pin 120 which projects diametrically therethrough.

As shown, the disc 119 is splined to the shaft 115 as at 121 so as to permit longitudinal movement thereof axially of the shaft 115 simultaneously with the rotation thereof in unison with the shaft 115. A bushing 122 is disposed within the bore of the bearing 116, the projecting extremity thereof being threaded to receive a manually operated wheel 123 which is spaced from the disc 119 to receive a spiral spring 124 therebetween, the spring 124 enveloping the shaft 115 to normally urge the disc 119 in frictional contact with the sprocket wheel 114.

With this arrangement, rotation of the sprocket wheel 114 relative to the shaft 115 may be controlled, this being a variable factor depending on the tension in the spring 124 occasioned by the manipulation of the wheel 123. The shaft 115 terminates in a clutch member 125 which co-operates with a complemental member 126 secured to the armature shaft 127 of an electrically operated motor 128. The clutch element 125 is provided with an annular groove 129 in the hub thereof to receive axially aligned pins 130 fixed to a furcated lever 131, the lever 131 being pivoted at 132 to an arm 133 constituting an integral part of the bearing standard 117.

Thus the rollers 104, 105, 106, and 107 may be rotated with any speed relative to the armature shaft 127 to control the density of the congealed substances discharged therethrough, in that the rotation of the rollers in a direction assisting the discharge of the cream would lessen the density thereof. On the other hand, the rollers may be maintained stationary so that the surfaces thereof will frictionally contact with the cream to more or less resist the discharge therethrough, thereby increasing the density thereof. The rollers are maintained stationary by means of a brake 134 which co-acts with a drum 135 secured to the extremity of the shaft 115. The mere idling of the rollers occasioned by the release of the tension in the spring 124 will serve to vary the density as will be obvious, thereby enabling a density variance within a wide range. It may perhaps be advisable to highly compact the congealed flakes to a degree not obtainable by the mere maintenance of the rollers stationary, and in that instance it is quite possible to reverse the rotation of the rollers so as to forcibly resist the discharge of the cream occasioned by the reciprocation of the piston 95. This will render the consistency thereof far more dense than is otherwise obtainable.

Obviously, the congealed substances are discharged through the rollers in ribbon form, the ribbon being received in this instance upon an endless conveyor belt 136 carried by the rollers 137 (one shown) which are journalled in brackets 138 secured to the standard 62 within the zero room 21, thereby enabling the projection of the conveyor 136 through the wall thereof for conveying the cream to any desired destination, preferably to a cold storage room.

Simultaneously with the discharge of the substances from the zero room, the ribbon is severed into segments of any desired size, this being accomplished by the cutting instrumentalities associated with the endless conveyor 136. As shown, the endless conveyor 136 is provided with a series of guides 140 defining spaced parallel grooves 141 which co-operate with severing instrumentalities constituting, in this instance, a reel 142 having a series of circumferentially spaced lugs 143 fixed thereto. The reel 142 is carried by the shaft 144 journalled in confronting brackets 145 which serve to sustain the reel 142 in fixed spaced relation with respect to the conveying surface of the belt 136. A plurality of confronting arms 146 are pivoted in the lugs 143 to sustain a cutting wire 147 which is tensioned therebetween. The extremities of the arms 146 are provided with a projecting cam 148 which co-operates with the grooves 141 to direct the tensioned wire 147 toward the carrying surface of the conveyor 136, thereby severing the congealed substances disposed on the conveyor belt 136. Subsequent to the severance of the congealed substances into segments, they are packaged in any suitable manner and carried to a storage compartment wherefrom they are removed for consumption.

It is customary to flavor congealed substances with fresh fruits or other concentrates. To effect the distribution of such flavors within the substances to be congealed, a hopper 150 is provided exteriorly of the zero room 21, in this instance superposed thereabove for communication with a chute 151 projecting within the zero room 21. The chute 151 has intermediate its end and communicating with one side thereof a chamber 152 having a propeller 153 rotatively mounted therein. The lower end of the chute 151 delivers the fruit or other material adjacent the ends of the drums 57 and 58, and lets it drop into the trough 90 where it is mixed with the frozen flakes of ice cream. The propeller 153 is carried by a shaft 154 which projects exteriorly of the chamber 152 to receive a disc 155 fixed thereto for movement therewith. Rotation is imparted to the propeller 153 by virtue of a disc 156 in frictional contact with the disc 155 to effect the rotation thereof, the disc 156 being splined to the shaft 157 journalled in the brackets 158 and 159 depending within the zero room 21 from the top thereof.

It is highly desirable to impart rotation to the propeller 153 at a speed conforming with the desired quantity of fruits or other flavored substances to be associated with the congealed mixture, and therefore it is necessary to provide means to render the speed of rotation adjustable. This is accomplished in the present embodiment by providing a lever 160 having the furcated extremity 161 thereof operatively connected to the hub of the disc 156. The lever 160 is pivoted at 162 so that it can be manipulated exteriorly of the zero room to vary the radial movement of the disc 156 relative to the disc 155, the speed of rotation of the disc 155 depending upon the radial point of contact.

Movement is imparted to the various instrumentalities described hereinabove from a common power source, although individual power means may be provided for the various instrumentalities as commercial practice may dictate. The power source consists, in this instance, of an electric motor 163 disposed in any desired position. As shown, the electric motor 163 is disposed within the zero room 21 and sustained from the ceiling thereof in any suitable manner. The armature shaft 164 thereof is operatively connected to a worm gear unit 167 by virtue of a chain drive 166 engaging a sprocket 165 carried by the input shaft of said unit. The shaft 157 forms the output shaft of said unit and receives rotation therefrom at a reduced rate of speed.

A gear 168 fixed to the shaft 157 meshes with a flexible chain 169 which is operatively connected to a sprocket wheel 170 carried by the shaft or hub 60 whereon a roller 58 is carried. The shafts 59 and 60 are provided with intermeshing spur gears 171 and 172 which effect the rotation of the rollers or refrigerating surfaces in opposed directions in response to the movement imparted to the chain 169 operatively connected to the power source. A pinion 173 is journalled to the standard 62 (Figure 3) in mesh with the gear wheel 172 to impart rotation to a gear 174 fixed to the shaft 92 carrying the helical conveyor 91. A gear 175 carried by the shaft 103 meshes with the gear 174 to impart rotation to said shaft, thereby effecting the reciprocation of the piston 95 in operative connection therewith through the instrumentalities described hereinabove. The shaft 99 which rotates the crank arm 98 also carries a gear meshing with the flexible chain 176 to drive a sprocket wheel 177 operatively connected by an adjustable friction drive to operate the roller 137 to effect the travel of the conveyor 136.

It is to be noted that the weight of the ribbon of cream on the belt extruded by the piston 95 imparts sufficient tractive power to control the operation of the belt 136 without permitting any slippage of the material thereon, thereby insuring uniform lengths of segments. In other words, the density control is independent of the cutting instrumentalities in that the speed of the belt 136 is not fixed by the speed of the flexible chain 176 because of the friction drive interposed between the wheel 177 and roller 137.

It is highly desirable to introduce carbon-dioxide or other inert gases within the zero room so as to annihilate the bacterial contained therein, especially those present in the liquid poured from the containers 10 and 11 to effect the congelation thereof. Therefore, a tank 178 containing carbondioxide is provided with a pipe 179 containing a valve 180 to control the introduction of the inert gas within the zero room.

With the arrangement of parts above described it will be apparent that novel method and means have been provided to continuously produce congealed substances, control their density, and effect the severance thereof prior to packaging, which is highly desirable from the standpoint of commercial distribution.

Various changes may be made in the embodiment of the invention herein specifically described without departing from or sacrificing any of the advantages thereof as defined in the appending claims.

In operation, the pump 18 circulates the material to be frozen through the headers 19, 20, 23 and 24, and surplus material which does not pass through the nozzles is allowed to return to the supply reservoir 10 or 11 through the relief valve 25. This maintains the header full of the material to be frozen, and also, due to the circulating system, prevents a stoppage in the header due to too great an extent of pre-cooling. The air or fluid compressor 48 provides the necessary atomizing force, and as will be seen from the drawings, the coldest air, that which is near the bottom of the chamber, is drawn into the compressor through an interchanger where it gives up some of its refrigeration to the higher pressure air going to the nozzles. This air, while thus refrigerated, also is further refrigerated due to its further reduction in pressure through the orifices 46 and 47 of the atomizer, due to the well known laws governing the adiabatic expansion of gases. As the mist descends, it is directed towards the center of the two rolls 57 and 58, adhering to one or the other of these rolls. This material is constantly removed from these rolls in its hardened condition by the knives 85 and 88 placed underneath the rolls. As the material which has been removed from the rolls passes along the cooling trough 90, there is metered into this material an additional flavoring, fruits, nuts or other ingredients, by the hopper and adjustable feed arrangement. These ingredients are added in timed relation with the operation of the remainder of the apparatus so that a uniform and continuous ratio may be maintained between these added ingredients and the material which is being processed on the rolls.

As the combined mass reaches the packing device shown in Fig. 12, it is compressed to the desired shape and density, and as it travels over the belt 136, it is cut to the desired lengths by the cutter 147. The density control mechanism as shown in Fig. 12, provides a very wide range of adjustment. When the motor 128 is engaged through the friction disc 118, it is assisting the rollers 104, 105, 106 and 107, through their connecting gearing, to turn, and thereby assist the plunger 95 to advance the product.

On the other hand, when this motor is disengaged, and the brake 134 is engaged by means of the tension exerted on wheel 123, and on spring 124, against friction disc 119, then these rollers, which form the aperture, are retarded and thus the effort required of the plunger 95 to extrude the material is increased. In this latter case, we would have material of the greatest density, and in the former case, where the motor was connected, we would have a product of the lowest density, and with any intermediate adjustment that may be desirable. In the case of incorporation of a fluid other than air, this is taken care of by attaching a container for such fluid to the valve 180, and allowing such fluid to displace all of the air in the chamber 21, and also to supply the amount which is taken up by the product and used for atomizing.

I claim:

1. A process of producing frozen substances which consists in directing a liquid along a predetermined path, discharging the liquid through nozzles in direct association with a jet of air to effect the atomization thereof, exposing the resulting product to frigid surfaces, and removing the congealed substance from said surfaces.

2. A process of producing frozen substances which consists in directing a liquid along a predetermined path, discharging the liquid through nozzles in direct association with a jet of air to effect the atomization thereof, exposing the resulting product to frigid surfaces, and removing the congealed substances from said surfaces to effect a ribbon discharge and simultaneous control of the density thereof.

3. A process of producing frozen substances which consists in directing a liquid along a predetermined path, effecting the atomization thereof with the use of a jet of air, receiving the resulting product on frigid surfaces until congealed, and forming the congealed substance into bricks of predetermined density.

4. A process of producing frozen substances which consists in directing a liquid through constricted orifices in association with a jet of air under pressure, discharging the liquid against endless moving surfaces, maintaining said surfaces frigid to effect the congelation of the liquid, and scraping the congealed substance from said surfaces.

5. A process of producing frozen substances which consists in directing a liquid through constricted orifices in association with a jet of air under pressure, discharging the liquid against endless moving surfaces, maintaining said surfaces frigid to effect the congelation of the liquid, scraping the congealed substance from said surfaces, and packing said congealed substances to impart a predetermined density thereto.

6. The combination with a liquid supply, of means for effecting the travel of said liquid along a predetermined path, orifices in said path adapted to atomize said fluid simultaneously with the discharge thereof, surfaces for receiving the discharge thereon, means for maintaining said surfaces frigid to effect the congelation of the substances thereon, and means for imparting movement to said surfaces.

7. The combination with a liquid supply, of means for effecting the travel of said liquid along a predetermined path, orifices in said path adapted to atomize said fluid simultaneously with the discharge thereof, surfaces for receiving the discharge thereon, means for maintaining said surfaces frigid to effect the congelation of the substances thereon, means for imparting movement to said surfaces, scrapers co-acting with said moving surfaces to remove the congealed substances therefrom, and conveying means disposed below said surfaces for effecting the travel of the substances along a predetermined path.

8. The combination with a liquid supply, of means for effecting the travel of said liquid along a predetermined path, orifices in said path adapted to atomize said fluid simultaneously with the discharge thereof, surfaces for receiving the discharge thereon, means for maintaining said surfaces frigid to effect the congelation of the substances thereon, means for imparting movement to said surfaces, scrapers co-acting with said moving surfaces to remove the congealed substances therefrom, conveying means disposed below said surfaces for effecting the travel of the substances along a predetermined path, and means in the path of said substances to control the density thereof.

9. The combination with a liquid supply, of means for effecting movement of said liquid along a predetermined path, a series of nozzles in the path of said fluid, means for supplying air through said nozzles to effect the atomization of said fluid, rotating rollers for receiving the atomized fluid thereon, and means for maintaining the surface of said rollers frigid to effect the congelation of said atomized fluid.

10. The combination with a liquid supply, of means for effecting movement of said liquid along a predetermined path, a series of nozzles in the path of said fluid, means for supplying air through said nozzles to effect the atomization of said fluid, rotating rollers for receiving the atomized fluid thereon, means for maintaining the surface of said rollers frigid to effect the congelation of said atomized fluid, and means for controlling the density of the congealed substances.

11. The combination with a liquid supply, of means for effecting movement of said liquid along a predetermined path, a series of nozzles in the path of said fluid, means for supplying air through said nozzles to effect the atomization of said fluid, rotating rollers for receiving the atomized fluid thereon, means for maintaining the surface of said rollers frigid to effect the congelation of said atomized fluid, means for controlling the density of the congealed substances, and means for effecting the severance thereof into segments of any size.

12. The combination with a liquid supply of means for effecting the travel of said liquid along a predetermined path, nozzles in said path through which said liquid is discharged, surfaces for receiving the discharged liquid thereon, means for maintaining said surfaces frigid to effect the congelation of the substance thereon, means for removing the congealed substance therefrom, an orifice having movable walls, means for extruding said congealed substance through said orifice, and mechanism for varying the rate of movement of said orifice walls for varying the resistance thereof to material flow and thereby varying the density of the extruded product.

13. The combination with a liquid supply of means for effecting the travel of said liquid along a predetermined path, nozzles in said path through which said liquid is discharged, surfaces for receiving the discharged liquid thereon, means for maintaining said surfaces frigid to effect the congelation of the substance thereon, means for removing the congealed substance therefrom, a plurality of movable rollers arranged to define an opening, means for extruding the congealed material through said opening, and means for varying the rate of movement of said rollers for varying the resistance thereof to material flow whereby the density of the extruded product may be varied.

14. The combination with a liquid supply chamber of means for pumping a stream of liquid therefrom, a plurality of spray nozzles adapted to receive a portion of said liquid, a conduit adapted to return the excess of said liquid from said nozzles to said supply chamber, a refrigerated surface adapted to receive and congeal the material sprayed through said nozzles, and mechanism for removing the congealed material therefrom.

15. The combination of a plurality of spray nozzles, means for supplying a liquid thereto, a pair of movable refrigerated drums positioned closely together upon parallel axes, said nozzles being adapted to spray said liquid upon the upper surface of said drums to be congealed thereby, mechanism for rotating said drums to carry said congealed material about the outer surfaces thereof, and means for removing said material from the undersurface of said drums.

16. A process of producing a frozen and flavored substance which consists in continuously congealing a stream of mix and continuously introducing fruits or their concentrates at a measured rate into the congealed mix.

17. A process of producing frozen and flavored substances which consists in continuously congealing a stream of mix and continuously introducing fruits or their concentrates at a measured rate into said mix.

18. A process of producing frozen and flavored substances which consists in continuously congealing a moving stream of mix and continuously introducing fruits or their concentrates into said mix at a rate proportional to the rate of movement of said mix.

19. A method of forming a frozen product including the steps of supplying a frozen material in a flake like form, adding a portion of edible solids thereto and thereafter compacting the product into a continuous column of the desired cross section and density.

CLARENCE W. VOGT.